(12) United States Patent
Dupont

(10) Patent No.: US 12,516,999 B2
(45) Date of Patent: Jan. 6, 2026

(54) METHOD FOR LOCATING A LEAK IN A WATER SUPPLY NETWORK

(71) Applicant: Kamstrup A/S, Skanderborg (DK)

(72) Inventor: Sune Hoveroust Dupont, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 134 days.

(21) Appl. No.: 17/715,256

(22) Filed: Apr. 7, 2022

(65) Prior Publication Data

US 2022/0326107 A1 Oct. 13, 2022

(30) Foreign Application Priority Data

Apr. 8, 2021 (EP) .................................. 21167496

(51) Int. Cl.
*G01M 3/00* (2006.01)
*E03B 7/00* (2006.01)

(52) U.S. Cl.
CPC ............. *G01M 3/002* (2013.01); *E03B 7/003* (2013.01)

(58) Field of Classification Search
CPC ....... G01M 3/002; G01M 3/243; E03B 7/003; E03B 7/072; E03B 7/078; Y02A 20/00; F17D 5/06
See application file for complete search history.

(56) References Cited

U.S. PATENT DOCUMENTS

| 4,336,708 | A | * | 6/1982 | Hobgood | .............. | G01M 3/002 |
| | | | | | | 73/40.5 R |
| 10,508,966 | B2 | * | 12/2019 | Tooms | ..................... | G01M 3/26 |
| 2004/0225458 | A1 | * | 11/2004 | Sherikar | .................. | F17D 5/02 |
| | | | | | | 702/51 |
| 2014/0290343 | A1 | * | 10/2014 | Kulkarni | ............... | G01M 3/002 |
| | | | | | | 73/40.5 R |
| 2018/0010978 | A1 | * | 1/2018 | Bailey | .................... | G01P 13/006 |
| 2019/0025148 | A1 | * | 1/2019 | Tombak | ................ | G01M 3/002 |
| 2019/0033261 | A1 | * | 1/2019 | Nielsen | ................ | G01N 29/032 |
| 2019/0154535 | A1 | | 5/2019 | Cole | | |
| 2019/0154539 | A1 | * | 5/2019 | Banerjee | ............. | G01M 3/2853 |

FOREIGN PATENT DOCUMENTS

| EP | 3531368 A1 | | 8/2019 | | |
| WO | 2017005687 A1 | | 1/2017 | | |
| WO | WO 2019/086875 | * | 5/2019 | .............. | G01M 3/00 |

OTHER PUBLICATIONS

IMS, Ultrasonic Thermometry for Liquid (Year: 2010).*

* cited by examiner

*Primary Examiner* — Regis J Betsch
(74) *Attorney, Agent, or Firm* — McGlew and Tuttle, P.C.

(57) ABSTRACT

A method for locating a leak (19) in a water supply network with a water source (11) and one or more water consumption meters (21, 22) on the consumer side. The method includes calculating a length of the pipe (17) between the consumption meter (21) and the leak (19) location based on a temporal temperature curve and a quantity of water flowing through the at least one consumption meter (21).

20 Claims, 2 Drawing Sheets

METHOD FOR LOCATING A LEAK IN A WATER SUPPLY NETWORK

CROSS REFERENCE TO RELATED APPLICATIONS

The application claims the benefit of priority under 35 U.S.C. § 119 of European Application 21 167 496.5, filed Apr. 8, 2021, the entire contents of which are incorporated herein by reference.

TECHNICAL FIELD

The invention relates to a method for locating a leak in a water supply network and to a consumption meter configured for the implementation of this method.

TECHNICAL BACKGROUND

The most common water loses in water grids are caused by leaks in the pipe networks. Detecting and locating leaks in water networks can be done by using multiple technics. One of these technics is based on acoustics. When water exits a pressurized pipe through a leak, noise is generated. This noise can be used to detect and to locate the leak. Several methods exist and common to these are that the leak noise is captured using an analogue detecting device, i.e. microphones, hydrophones, accelerometers, piezo electric devices and the like. The detecting device can use one or more analogue filtering technics. The captured noise data can be processed using digital analysis. The analysis technics used on the noise data can be more or less sophisticated, ranging from simple energy measurements as peaks or rms values to more advanced methods such as frequency analysis or correlations between more detection devices. Which strategy is used depends on parameters like current consumption, detector spacing, wireless network capabilities and detector capabilities.

WO2017/005687A1 discloses a fluid consumption meter which is configured to detect acoustic noise level data to assist in locating fluid leakages in the fluid supply pipe network. As fluid consumption meters are installed in every house they can be used for acoustic leak detection. This acoustic leak detection works very well in practice, however, it is difficult to determine the exact location of the leak. For this, additional technics are necessary such as tracer gas, correlators or ground penetrating radar or the like. As the exact location—a so called pinpointing—of the leak is unknown often a large area has to be searched. This is time consuming, expensive and obstructing traffic.

SUMMARY

It is an object of the invention to provide an improved method for locating a leak in a water supply network. It is a further object of the invention to provide a device for conducting this method.

The method for locating a leak in a water supply network according to this invention uses the temporal temperature curve at a fixed point of the network and the quantity of water flowing through this fixed point to calculate the length of the pipe between this fixed point and the leak location. The water supply network comprises at least one water source and one or more electronic water consumption meters on the consumer side. The temporal temperature curve and the quantity of water flowing through is determined in a water consumption meter and the length of the pipe between this consumption meter and the leak location (position of the leak) is calculated.

The main idea of this invention is to use the temperature profile over time and the quantity of water flowing through a consumption meter to calculate the length of the pipe between the consumption meter and the leak location. By the temperature profile a time duration can be determined which is the time the liquid needs to flow from the leak to the consumption meter. The consumption meter knows the quantity of liquid which has flown through the consumption meter during this time. If the cross sectional area of the line is known, the length of the pipe between the consumption meter and the leakage can be calculated. According to this invention the temperature profile of the medium is used to locate the leak. How the temperature profile is used will be described in detail further below. The main idea of this invention is to use the change of temperature in the water network between a water source and one or more water consumption meters on the consumer side as the temporal temperature curve differs if there is a leak in the network or if there is no leak in the network on the way to this consumption meter.

Modern consumption meters comprise electronics for measuring, calculating and transmitting data to a head end system, a server or the like. This calculation of distance can be done in the consumption meter, in the head end system or server or in any computer, smart phone, tablet or the like data connected to the consumption meter, the head end system or the server.

As every water supply network has a plenty of consumption meters, this method according to the invention can be implemented by software and does not require any costly technical investments.

Locating a leak can be realized with at least one consumption meter. Preferably this is done by several consumption meters. The more consumption meters are used for locating the more accurate the pinpointing can be. Of course, it might be advisable to initiate locating the leak by different consumption meters not in parallel but in temporal distance.

As locating a leak is done using at least one consumption meter, it is advantageous to use this or these consumption meters not only for locating a leak but also for detecting the existence of the leak. An acoustic leak detection of one or more consumption meters can be activated before locating the leak. If several consumption meters are used, a rough estimate of the location of the leak can be done by using a pipe noise level detected by these consumption meters and caused by the leak. For location of a leak preferably those consumption meters should be used which are located nearest to the leak.

Determining the temporal temperature curve can be done by capturing the temperature of the water by a temperature sensor arranged in or connected to the consumption meter. Of course, it is not necessarily required to arrange a temperature sensor in the consumption meter if the temperature of the water is captured by measuring the speed of sound in the fluid inside the consumption meters and calculating the temperature based on the measured speed. This is a well-known method to determine the temperature of the meter if the meter works with piezo electric elements for flow measuring. These meters need a temperature adjustment before measuring and this temperature adjustment can also be used for determining the temperature of the liquid flowing through.

The method for locating a leak, according to the invention, is based on the effect that the water in the pipe network adapts its temperature to the temperature of the surroundings. This effect of course is depending on whether water is flowing through the pipe as this happens by the leak or if the water is standing still (no flow). Sometimes you will have to cause a flow of water in a pipe or a stop of flow to cause steps in the temporal temperature curve which are needed to determine a time interval for calculating the distance of the leak. According to the invention, the flow in the line is stopped for a period of time before the temporal temperature curve (profile over time) of the water flowing through the consumption meter is determined.

Preferably, not only the temperature of the fluid flowing through the meter is determined but also the ambient temperature of the consumption meter. If several consumption meters are used for locating the leak, the ambient temperature of each consumption meter should be captured. This ambient temperature will approximate the temperature of the fluid in the pipe of the meter after some time if there is no flow. If the flow in the pipe is stopped for a period of time, this period of time should correspond at least to the time which is needed to adapt the temperature of the water in the pipe leading to the consumption meter to the temperature of the surroundings of the pipe. This may be important in order to cause a temperature jump in the pipe at the location of the leak which has to be detected for later calculating the distance between the leak and the meter.

Such a jump in temperature in the temporal temperature curve which is captured by temperature measurement inside the consumption meter has to be detected. If this jump in temperature has been detected, the distance of the pipe between the leak and the consumption meter can be calculated based on the cross section of the pipe and the quantity of water that has flown through the consumption meter during the time between starting of the flow and the detection of the temperature jump.

It may be advantageous to modify the calculation of the length of the pipe by a compensation factor relating to one or more of the following:

length of pipe from consumption meter to an outer wall of a house
deviations of the pipe routing from a straight line between the main distribution pipeline and the house.

As electronic consumption meters are used for acoustic leak detection, this acoustic leak detection should be done before the leak location which means that the leak location using at least one consumption meter should be triggered by an acoustic leak detection by the consumption meter or a consumption meter in the neighborhood.

Electronic consumption meters as they are disclosed in WO 2017/005687 A1 (which is incorporated herein by reference in its entirety) can be easily configured for the implementation of this method for locating a leak. This method can be implemented without any additional hardware. A software implementation may be sufficient. However, additional hardware can be advantageous. The consumption meter may comprise a temperature sensor for sensing the temperature of the consumption meter or the temperature of the surroundings of the consumption meters. These temperature sensors are rather cheap and do not need much room or evaluation electronics. On the other hand, as mentioned before, the temperature of the water flowing through the meter can be determined without a temperature sensor but by using the temperature calibration process which takes place inside the meter to adjust the measurement of the flow as this is done in ultrasonic consumption meters. There the speed of sound in water is measured to determine the temperature of the water.

For stopping the flow it may be advantageous to use a consumption meter with integrated shut off valve which is electrically controlled. Alternatively, an electrically controlled shut off valve can be arranged in the pipe in front or behind the meter. Controlling of the valve can be done wirelessly or by wire.

As electronic water consumption meters mostly do not have an external electrical source but an internal battery which has to last a long time, it may be advisable to limit the consumption meter in carrying out this locating of leak for three, five or any other number of times to make sure that this executing of leak locating does not influence the regular lifetime of the meter.

It is advantageous if the implementation of the method according to this invention to a meter can be arranged by additional programming the control electronics inside the consumption meter. Maybe that there is a special subcircuit in the electronics for doing this. Signal transfer of these meters is done wirelessly by radio to a head end system. Of course, this radio transmission could be adapted to receive the signal by a special receiver, a smart phone or any other suitable receiving device. Alternatively, there may be inductive transmission through the housing of the meter of data as well as electrical energy for carrying out this method according to the invention.

The method according to the invention for locating a leak is preferably carried out during a time interval in which the water flow is little as this is typically during the night or in the very early morning.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
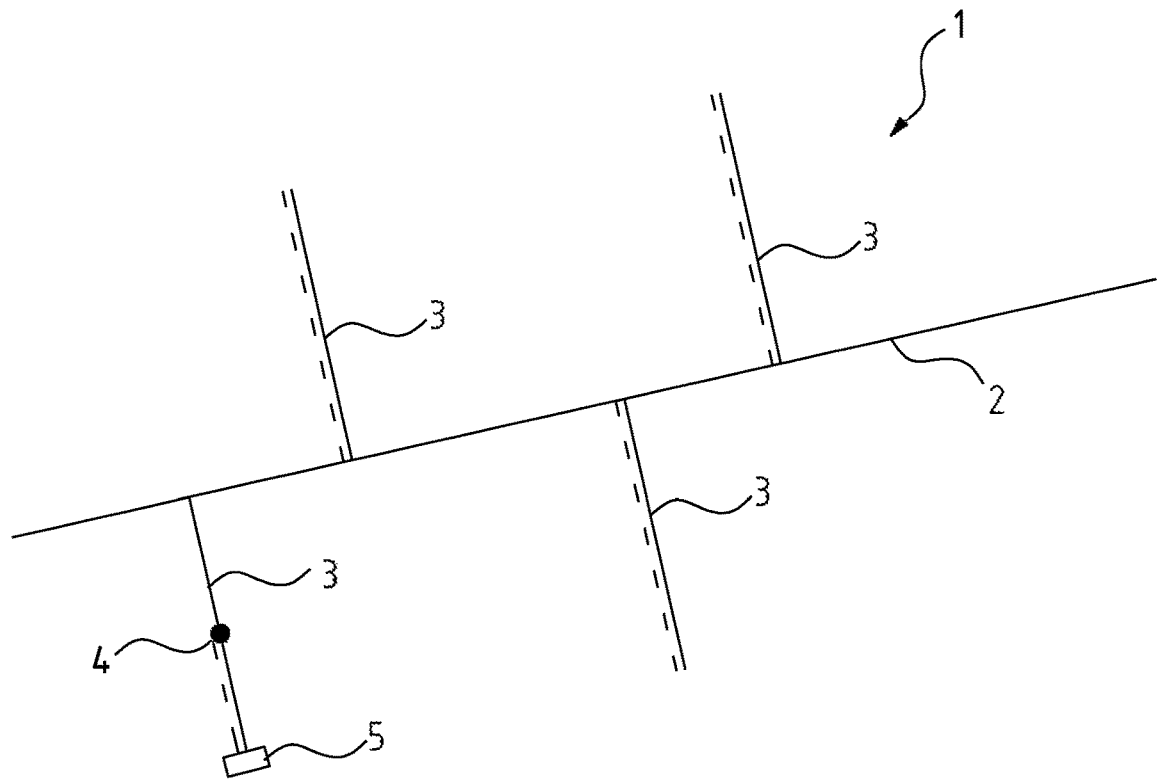
FIG. 1 is a view of a very simplified form of a water supply network.

In FIG. 1 the principle of different temperatures in a water supply network 1 is shown in a very simplified schematical drawing. There is a main line 2 of the grid 1 with flowing water inside of a low temperature for example 12° C. As there is a big volume flowing through the main line 2 this temperature is nearly constant.

From this main line 2 secondary lines 3 branch off. These secondary lines lead to consumers, for example houses. Especially if there is little or no consumption on the consumption side for example in the night, the water temperature in the secondary lines 3 adapts to the temperature of the environment in the ground. This temperature may be for example 14° C. This higher temperature in the secondary lines 3 is shown in dotted lines.

In FIG. 1 in the lower left secondary line 3 there is a leak 4. As water is flowing through this leak 4 even if there is no consumption in this secondary line 3 there will be a low temperature up to the leak 4 corresponding to the temperature of the water in the main line 2. From the leak 4 to the consumption side there is no flow. So, in this part of the secondary line 3 the temperature of the water corresponds after some time to the temperature of the surroundings which is 14° C.

If this secondary line 3 with the leak 4 is opened on the consumer side the water in this line 3 is flowing through a consumption meter 5 on the consumption side.

Figure 2:
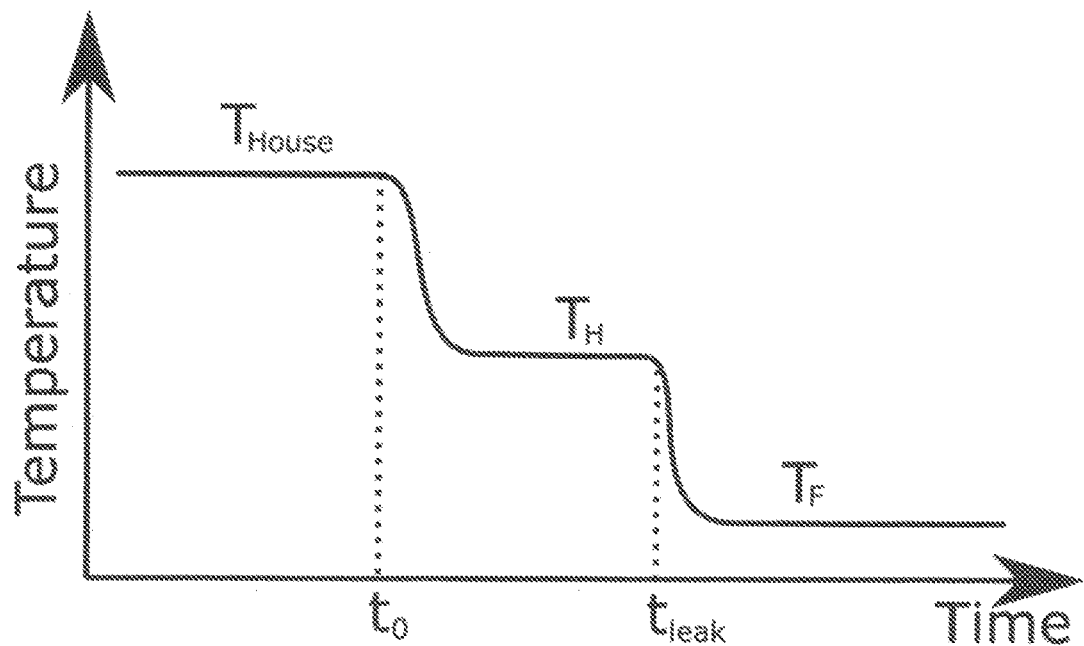
FIG. 2 is a view that illustrates a temporal temperature curve captured by a consumption meter.

In FIG. 2 the temporal temperature curve of the water standing in or flowing through the consumption meter 5 is shown. When the flow has started the temperature in the consumption meter 5 corresponds to the temperature in the house $T_{House}$. Shortly after this start at the time $t_0$ the temperature of the water flowing through drops to the temperature $T_h$ which is the temperature of the water in the part of the secondary line 3 between the leak 4 and the consumption meter 5.

At a time $t_{leak}$ the temperature again drops to a temperature $T_F$ which corresponds to the temperature in the main line 2 and in the first part of the secondary line 3 up to the leak 4. If the flow now is stopped the temperature in the consumption meter 5 will raise again to the temperature $T_{House}$.

For locating the leak the time interval between to and $t_{leak}$ is determined. From the consumption meter 5 it is known which volume of water has flown through the consumption meter 5 during this time interval ($t_0$-$t_{leak}$). Further, the pipe dimension, i.e. its diameter, can be pre-programmed into the consumption meter or wirelessly transferred into the meter. A typical diameter is between 50 mm and 100 mm. As the pipe dimension of this secondary line 3 is known the length of the pipe between the leak 4 and the consumption meter 5 can be calculated by dividing the volume which has flown through in the time interval $t_0$-$t_{leak}$ by the cross-sectional area of the pipe. This is the basic principle of the method according to the invention.

Figure 3:
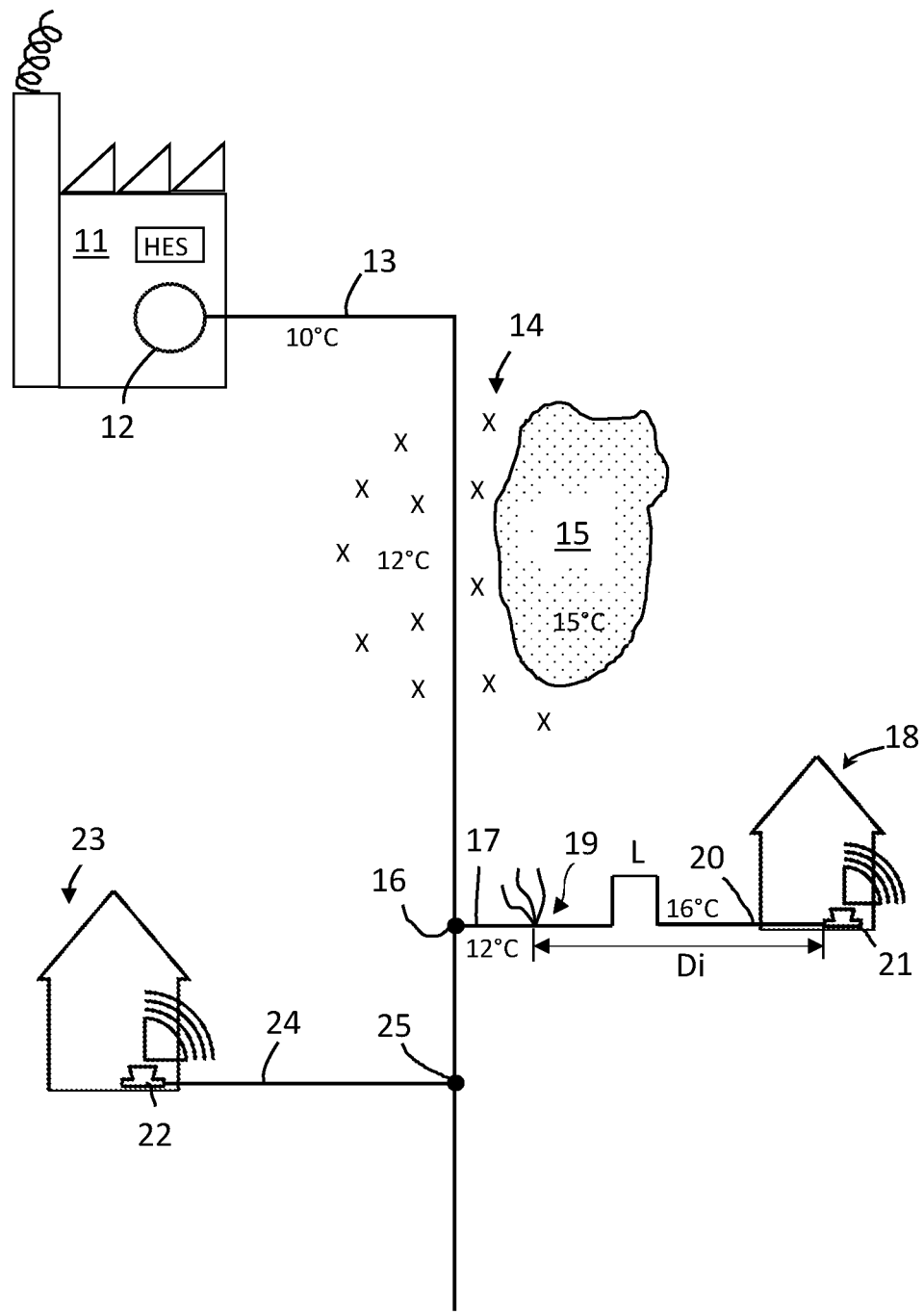
FIG. 3 is a view that illustrates a simplified water supply network with several consumers and consumption meters and a leak which has to be located.

In FIG. 3 it is shown how this method could be realized in practice:

The water for the shown water supply network comes from an utility water work 11 with a large and central pump station 12 pumping drinking water into a distribution pipeline 13 which is the main line of a water supply network. The water coming from the utility water work 11 has a temperature typically between 5° C. and 15° C. This temperature is dependent on the environment temperature and the size of the reservoir of the utility water work 11. In this example it is assumed that the temperature of the water entering the distribution pipeline 13 is 10° C. On its way through the distribution pipeline 13 the water changes its temperature depending on the temperature of the surrounding soil and the flow speed. In FIG. 3 this distribution pipeline 13 crosses an area 14 which is near by a local lake 15 with water temperature of 15° C. The temperature of the water in the lake 15 is transferred to the soil and through the soil to the water in the distribution pipeline 13 crossing this area 14. In this example the temperature of the water in the distribution pipeline 13 rises to 12° C. having crossed this area 14. This increase of temperature depends among other factors on the flow rate, the flow volume and the thermal conductivity of the wall of the pipe.

On its way through the distribution pipeline 13 the water comes to a node 16 where the main distribution pipe 13 branches into a smaller pipe 17 which is a residential pipe leading to a house 18. The temperature of the water in this smaller pipe 17 is 12° C. at the beginning. In this residential pipe 17 there is a leak 19 in the pipe. Through this leak 19 water pours out. With respect to the leak 19 there is a continuous flow through the residential pipe 17 from the node 16 to the leak 19. In flow direction behind this leak 19 there is a smaller flow of water if there is any consumption of drinking water in the house 18. There may be no flow if there is no consumption of drinking water in the house 18. As a result the water temperature in the section 20 of the residential pipe 17 rises. The section 20 is the part of the pipe from the leak 19 to the house 18. In this section 20 the temperature of the water rises to 16° C. as the water inside the pipe is heated by the surrounding soil. This temperature in the section 20 of the pipe 17 of course depends on the consumption of water in the house 18 and further of the temperature of the surrounding soil.

In the house 18 there is a consumption meter 21 which is an electronic consumption meter measuring the flow rate by means of ultrasonic technology. The consumption meter 21 does not only determine the volume flowing through the meter 21 but also the temperature of the water flowing through. For measuring the temperature there may be a temperature sensor inside the consumption meter 21 measuring the temperature of the water flowing through the consumption meter 21. Alternatively the temperature of the water flowing through the consumption meter 21 can be calculated in a water temperature determining unit by measuring the speed of sound in water when using a so-called absolute time measurement which can be implemented in the consumption meter 21.

The method for locating the leak 19 best works if a water flow to the house 18 is stopped for a while so that the water being in the section 20 of the residential pipe 17 can adapt the temperature of the surroundings. Also the water inside the consumption meter 21 adapts the temperature of the surroundings in the house 18. When a flow through the consumption meter 21 is initiated, then this flow starts with the temperature of the water $T_{House}$ as the water in the consumption meter 21 and the pipe leading to this consumption meter 21 inside the house 18 adapt the temperature of the house 18. The locating process starts when the flow through the consumption meter 21 starts and the temporal temperature curve as shown in FIG. 2 starts.

When the consumption meter 21 is in the leak locating modus, temperature of the water inside is analyzed. When a sharp sudden decrease is detected in the consumption meter 21, this is reported through wireless communication to a head end system. According to FIG. 2 this sudden change in temperature from $T_{House}$ which is 18° C. to $T_H$ which is 16° C. in this example is detected. Measurement of time and flow starts with to while water is further flowing through the pipe to the consumption meter 21. The flow rate is measured which is for example one liter per second. The temperature of the water is further watched. When the temperature of the water flowing through the consumption meter 21 drops for a second time teak the time interval from $t_0$-$t_{leak}$ is determined and further the volume of flow through the consumption meter 21 during this time interval $t_0$-$t_{leak}$ is determined. This second decrease in temperature from $T_H$=16° C. to $T_F$=12° C. happens as the water in the section 20 of the pipe which has a temperature of $T_H$=16° C. has flown through the consumption meter 21. At the time $t_{leak}$ the temperature decreases again as the water from the section of the residential pipe 17 between node 16 and leak 19 arrives in the consumption meter 21. $t_{leak}$ and the volume flowing through the consumption meter 21 during this time interval is reported to the head end system.

After these two steep flanks at the time $t_0$ and $t_{leak}$ have been detected, the location of the leak 19 is calculated either in the meter 21 or in the head end system. As this residential pipe 17 has a constant cross section the length of the section 20 can be calculated by dividing the volume which has flown through the consumption meter 21 during the time interval from $t_0$-$t_{leak}$ by the cross section which is $$\pi \times \frac{D^2}{4},$$

D is the diameter of the residential pipe 17. As a result, a length L is calculated which is the length L of the pipe 20 between the leak 19 and the consumption meter 21.

Often the temporal temperature curve is not as clear and simple as that of FIG. 2. The problem may be that the difference of the temperature in the residential pipe 17 before and after the leak 19 is not big enough or does not have a steep decline. This difference of temperature should be as big as possible. So it might be necessary before starting the location procedure to stop the water flow through the section 20 of the pipe 17 by installing a shutoff valve inside or next to the consumption meter 21. This shutoff valve is controlled by the control electronics of the consumption meter and the shut off may be initiated after a first acoustic leak detection when starting the leak location process. For this leak location process the valve remains closed for two or three hours which time is as long as to adapt the temperature of the water in the section 20 of the pipe to the surroundings. It is advisable to start the leak location process during the night if the flow has to be interrupted for several hours.

After this time, the valve is opened and the afore-described leak location process starts so that the sudden temperature decreases can be detected (see FIG. 2).

This acoustic leak detection is well-known and there are consumption meters which are configured to do this acoustic leak detection. Both acoustic leak detection and leak location should be initiated by external control as these methods conducted by the consumption meters need additional electrical energy which has to be provided from the battery inside the meters which is limited. For this acoustical leak detection several consumption meters 21 should typically be used.

Referring to FIG. 3 there is the consumption meter 21 in the house 18 and a further consumption meter 22 in a house 23. The house 23 with a consumption meter 22 is connected over a smaller pipe 24 which is a residential pipe 24 and which branches off from the distribution pipeline 13 at a node 25. The node 25 is as can be seen in FIG. 3 (in the direction of flow through the distribution pipeline 13) behind the node 16. Depending on the distances, an acoustic leak detection performed by the consumption meters 21 and 22 both or one of these will detect the leak 19. When evaluating the acoustic leak detection curves of the consumption meters 21 and 22 it will be clearly recognizable that the leak 19 is in the residential pipe 17 and not in the residential pipe 24. This will be recognizable from the intensity of the acoustical leak signals. When this acoustical leak detection has been finished, the consumption meter 21 is chosen for executing the leak location by analyzing the temporal temperature curve as described before with FIG. 2.

While specific embodiments of the invention have been shown and described in detail to illustrate the application of the principles of the invention, it will be understood that the invention may be embodied otherwise without departing from such principles.

LIST OF REFERENCE CHARACTERS 1 water supply network
2 main line
3 secondary line
4 leak
5 consumption meter
11 utility water work
12 central pump station
13 main distribution pipeline
14 area
15 lake
16 node
17 smaller pipe/residential pipe
18 house
19 leak
20 section of the pipe 17
21 consumption meter
22 consumption meter
23 house
24 smaller pipe/residential pipe
25 node
Di distance between the leak 19 and the consumption meter 21
L length of the pipe 20 between the leak 19 and the consumption meter 21

What is claimed is:

1. A method for locating a leak in a water supply network, the network comprising at least one water source, a main line with secondary lines branching off the main line and one or more electronic water consumption meters on a consumer side, the method comprising the steps of:
    allowing the water temperature in the secondary lines to adapt to the temperature of the environment in the ground;
    calculating a length of a pipe between at least one of the one or more electronic water consumption meters and a leak position based on a temporal temperature curve of the water flowing through the at least one of the one or more electronic water consumption meters and a quantity of water flowing through the at least one of the one or more electronic water consumption meters, wherein the flow in the pipe is stopped for a period of time before the temporal temperature curve of the water flowing through the at least one of the one or more electronic water consumption meters is determined.

2. A method according claim 1, wherein before calculating the length of the pipe between the at least one of the one or more electronic water consumption meters and the leak location based on the temporal temperature curve and the quantity of water flowing through this at least one consumption meter, an acoustic leak detection is conducted using the at least one of the one or more electronic water consumption meters.

3. A method according claim 1, wherein the temperature of the water is captured by a temperature sensor arranged in or connected to the consumption meter.

4. A method according to claim 1, wherein the temperature of the water is captured by measuring the speed of sound in the fluid inside the at least one of the one or more electronic water consumption meters and calculating the temperature based on the measured speed.

5. A method according to claim 1, wherein the ambient temperature of the at least one of the one or more electronic water consumption meters is captured.

6. A method according to claim 1, wherein the period of time of stopping corresponds at least to a time which is needed to adapt a temperature of the water in the pipe leading to the consumption meter to a temperature of the surroundings of the pipe.

7. A method according to claim 1, wherein a jump in temperature in the temporal temperature curve is detected, the length of the pipe between the leak and the consumption meter is calculated based on a cross-section of the pipe and a quantity of water that has flown through the at least one of the one or more electronic water consumption meters during a time between starting of the flow and the detection of the temperature jump.

8. A method according to claim 1, wherein the calculated length of the pipe is modified by a compensation factor, said compensation factor relating to one or more of the following:
   a length of the pipe from the at least one of the one or more electronic water consumption meters to an outer wall of a house; and
   deviations of a pipe routing from a straight line between a main distribution pipeline and the house.

9. A method according to claim 1, wherein the leak location is triggered by an acoustic leak detection by the consumption meter.

10. A consumption meter in a water supply network, the network comprising at least one water source, a main line with secondary lines branching off the main line and an ultrasonic consumption meter as one or more electronic water consumption meters on a consumer side, the ultrasonic consumption meter comprising:
   means for locating the leak in the water supply network, which is configured to calculate a length of a pipe between the ultrasonic consumption meter and a leak position based on a temporal temperature curve of the water flowing through the ultrasonic consumption meter and a quantity of water flowing through the ultrasonic consumption meter, wherein the water temperature in the secondary lines adapt to the temperature of the environment in the ground;
   a flow stopping means, wherein the flow in the pipe is stopped for a period of time via the flow stopping means before the temporal temperature curve of the water flowing through the at least one of the ultrasonic consumption meter is determined.

11. A consumption meter according claim 10, further comprising temperature determination means for determining a temperature of the water flowing through the consumption meter and/or an ambient temperature.

12. A consumption meter according to claim 11, wherein the temperature determination means comprises a temperature sensor for sensing the temperature of the consumption meter and/or a temperature of the surroundings of the consumption meter.

13. A consumption meter according to claim 11, wherein the meter is an ultrasonic consumption meter and the temperature determination means determines the temperature of the water flowing through by measuring the speed of sound in the water.

14. A consumption meter according to claim 10, wherein the flow stopping means comprises an electrically controlled shutoff valve in a pipe inside or adjacent to the consumption meter.

15. A consumption meter according to claim 10, wherein the means for locating the leak is part of control electronics forming a part of the consumption meter.

16. A method for locating a leak in a water supply network, the method comprising:
   providing a network comprising at least one water source, a main line with secondary lines branching off the main line and at least one electronic water consumption meter on a consumer side;
   allowing a water temperature in at least one of the secondary lines to adapt to a temperature of an environment in the ground to provide an adapted ground water temperature in the at least one of the secondary lines;
   determining a temporal temperature curve of the water flowing through the at least one electronic consumption meter and determining a quantity of water flowing through the at least one electronic water consumption meter;
   determining a length of a pipe between the at least one electronic water consumption meter and a leak position in at least one of the secondary lines based on the temporal temperature curve of the water flowing through the at least one electronic water consumption meter and the quantity of water flowing through the at least one electronic water consumption meter and the adapted ground water temperature, wherein the flow in the pipe is stopped for a period of time before the temporal temperature curve of the water flowing through the at least one electronic water consumption meter is determined.

17. A method according claim 16, wherein one of:
   the temperature of the water is captured by a temperature sensor arranged in or connected to the at least one electronic water consumption meter; and
   the temperature of the water is captured by measuring the speed of sound in the fluid inside the at least one electronic water consumption meter and calculating the temperature based on the measured speed.

18. A method according to claim 16, wherein a time duration of the water flowing from the leak to the at least one electronic water consumption meter is determined based on the temporal temperature curve.

19. A method according to claim 16, wherein the length of the pipe between the at least one electronic water consumption meter and the leak position is determined via the at least one electronic water consumption meter.

20. A method according to claim 16, further comprising:
   providing a temperature sensor;
   providing a shut-off valve, the at least one electronic water consumption meter comprising control electronics, wherein the control electronics actuate the shut-valve to stop the flow in the pipe for the period of time;
   detecting water temperatures of the water after the flow in the pipe is stopped, wherein the temporal temperature curve is determined based on the water temperatures.

* * * * *